United States Patent [19]

Landine et al.

[11] Patent Number: 5,587,080
[45] Date of Patent: Dec. 24, 1996

[54] FERMENTATION PROCESS

[75] Inventors: Robert Landine; Claude De Garie; Albert Cocci, all of Fredericton, Canada

[73] Assignee: ADI, Limited, Canada

[21] Appl. No.: 570,690

[22] Filed: Dec. 11, 1995

Related U.S. Application Data

[62] Division of Ser. No. 94,118, Sep. 22, 1993, Pat. No. 5,505,848.

[51] Int. Cl.$^6$ ............................................. C02F 3/28
[52] U.S. Cl. ........................ 210/603; 210/609; 210/630
[58] Field of Search ................................ 210/170, 188, 210/180, 195.1, 197, 218, 219, 242.1, 320, 538–540, DIG. 9, 603, 623, 630, 609

[56] References Cited

U.S. PATENT DOCUMENTS

| | | | |
|---|---|---|---|
| 1,719,418 | 7/1929 | Bennett et al. | 210/532.1 |
| 3,981,803 | 9/1976 | Coulthard | 210/180 |
| 4,040,963 | 8/1977 | Garrott, Jr. | 210/219 |
| 4,334,997 | 6/1982 | Peterson | 210/180 |
| 4,437,987 | 3/1984 | Thornton et al. | 210/DIG. 9 |
| 4,632,758 | 12/1986 | Whittle | 210/603 |
| 4,672,691 | 6/1987 | De Garie et al. | 210/218 |
| 4,861,519 | 8/1989 | Tusa et al. | 210/603 |
| 5,228,995 | 7/1993 | Stover | 210/603 |
| 5,527,464 | 6/1996 | Bartha et al. | 210/603 |

FOREIGN PATENT DOCUMENTS

| | | |
|---|---|---|
| 12354/55 | 3/1956 | Australia . |
| 45119/85 | 1/1986 | Australia . |
| 23481/88 | 4/1989 | Australia . |
| 33302/89 | 11/1989 | Australia . |

*Primary Examiner*—Thomas G. Wyse
*Attorney, Agent, or Firm*—Jones, Tullar & Cooper, P.C.

[57] ABSTRACT

There is disclosed a fermentation device having a peripherally extending wall, a gas-impermeable cover extending over the surface of the device, and attached at its peripheral edge to a top part of the wall, and a gas collection conduit extending for at least part of the periphery of the device within the wall. This device may be used for wastewater treatment enclosures.

8 Claims, 12 Drawing Sheets

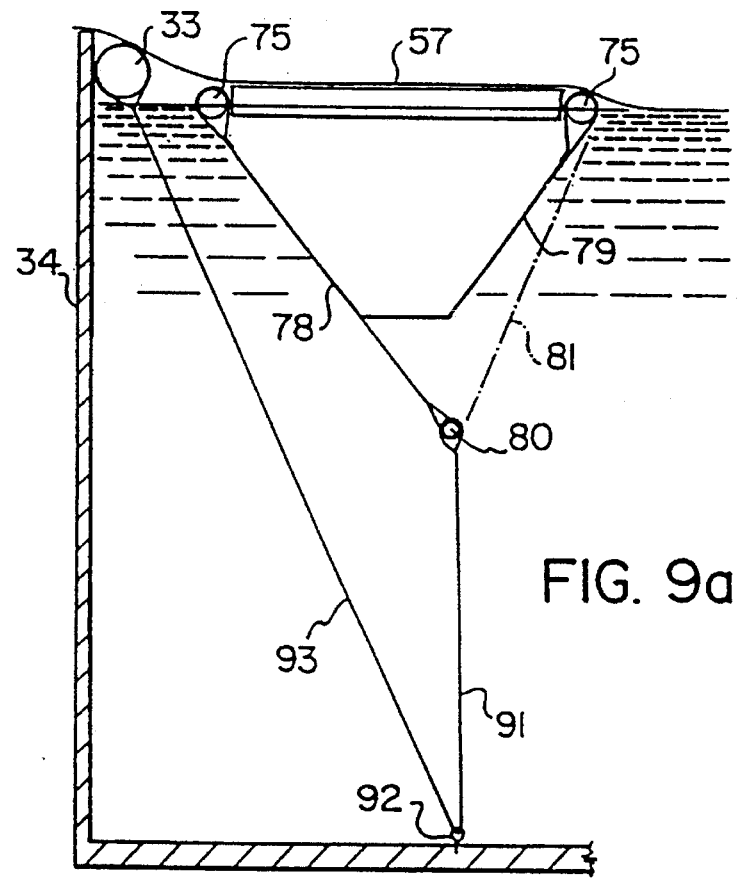
FIG. 9a
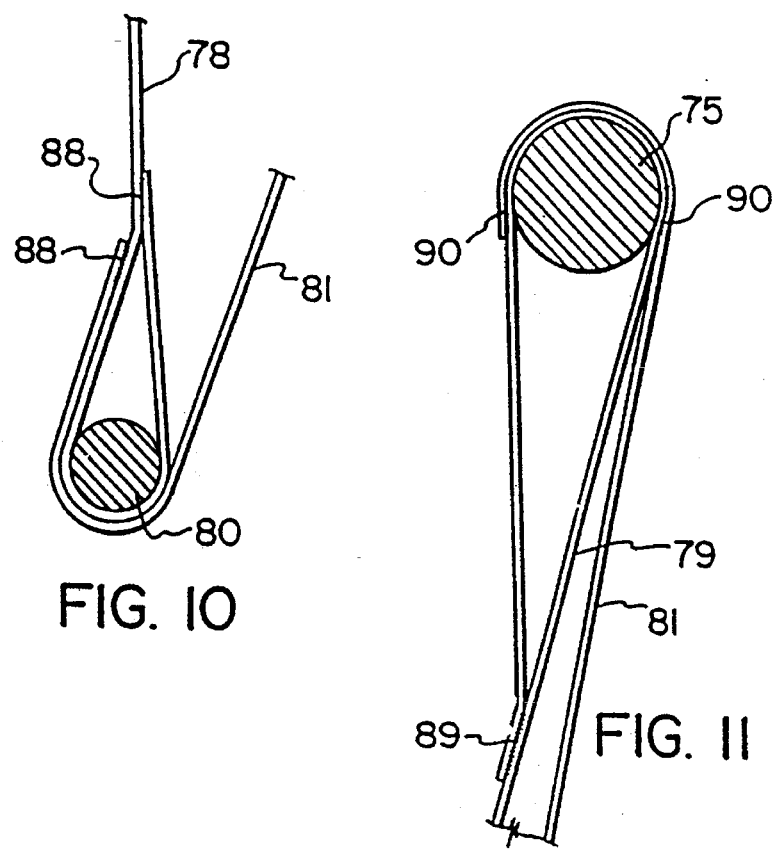
FIG. 10
FIG. 11

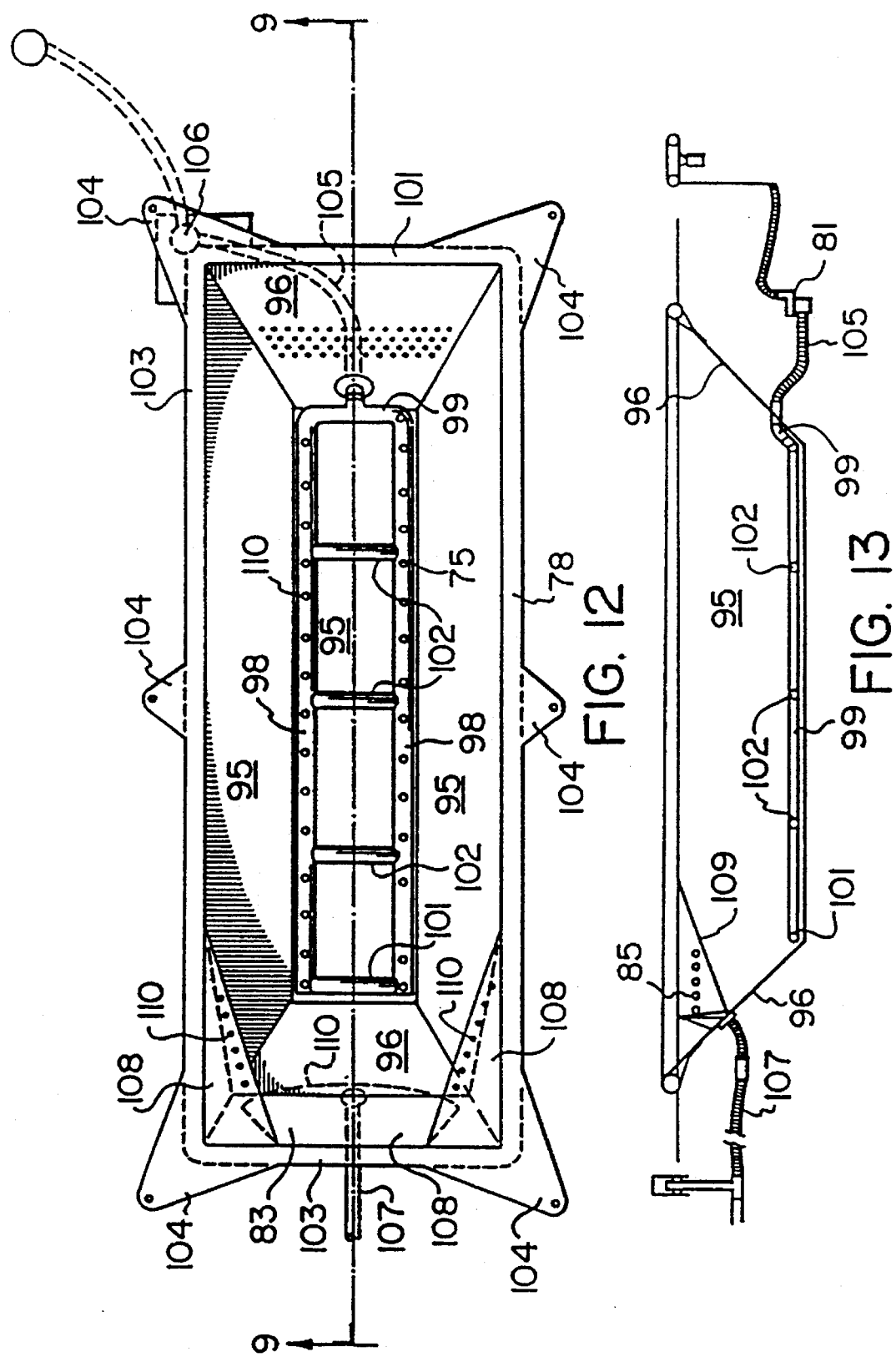

FERMENTATION PROCESS

This is a divisional of application Ser. No. 08/094,118 filed on Sep. 22, 1993, now U.S. Pat. No. 5,505,848.

FIELD OF THE INVENTION

This invention relates to fermentation apparatus, such as wastewater treatment enclosures and the like. Particularly this invention relates to improvements in various features of such apparatus, and in a preferred embodiment to anaerobic fermentation apparatus.

BACKGROUND OF THE INVENTION

Fermentation, as by aerobic or anaerobic digestion, is used to treat water, such as effluents from industry and municipalities. U.S. Pat. No. 4,672,691, in the name of the present assignees, issued Jun. 16, 1987, describes a bulk volume fermenter in the form of an enclosure having a membrane cover, with means for collecting methane produced by the anaerobic fermentation. In this arrangement the gas is collected in a conduit extending along the top of the containing wall. A central collecting duct is also described.

The present invention provides for various improvements in a bulk volume fermenter, particularly anaerobic fermentation apparatus, applicable to apparatus as described in the above-mentioned patent, but not restricted to such apparatus.

SUMMARY OF THE INVENTION

Broadly, in accordance with one feature of the invention, a collector duct or pipe is suspended inside the retaining wall, near the top, the pipe being perforated, or otherwise opened, to admit gas for collection. The cover membrane extends from the wall top over the pipe, and weighted members can be positioned, on The cover, to rest on the pipe to hold the cover down. In a further feature a floating collector pipe can be positioned under the cover inwardly of the walls, with a walkway over the floating pipe if desired.

In accordance with another feature of the invention, gas-liquid-solids separators can be provided either independently floating in the enclosure, or attached to and depending from the cover, and comprising a V-shaped cell, with one side extending below the other side, with an open bottom, unclarified liquor entering and solids dropping out. Uprising bubbles of gas are deflected away from the inside of the separator so as to provide a quiescent zone for settlement of sludge. Clarified liquor is drawn out through a header for a further treatment stage.

Yet a further feature comprises a collapsible baffle extending up from the bottom of the enclosure, to retain sludge towards an inlet position. The baffle lies on the bottom when the enclosure is empty but as the enclosure is filled, the baffle is lifted up, pivoting on the bottom, and effectively forming a weir. An additional baffle may be suspended from the cover, spaced a short distance from the collapsible baffle, downstream thereof, or upstream, or both.

Mixing of the material in the enclosure is often desirable and mixers are often positioned in enclosures to provide mixing. A feature of the present invention provides a mounting for a mixer, in which the orientation of a mixer can be altered. A lifting davit is mounted on the mounting for raising and lowering the drive motor and propeller, which are positioned on a square post. The motor and propeller mounting can be lifted and rotated to different positions at 90°. The davit, motor and propeller can be completely removed from the enclosure. A further mounting bracket permits a further, finer, positional adjustment.

The cover is held down in position by a weight system extending across the cover. Conveniently the weight system is not connected to the cover to permit relative movement. The weight system can be complemented, or replaced, by pockets or sleeves built into the cover and filled with water.

Preferably, in the above apparatus, the means, which suspends the conduit, comprises a plurality of spaced apart slings.

In a further preferred feature of the present invention there is provided means for removing sludge at an outlet position in the enclosure and recirculating the sludge to an inlet position in the enclosure. In still a further preferred feature of the present invention there is also provided means for combining at least part of the recirculated sludge with a waste liquor being fed to the enclosure. There may also be provided means for combining the recirculating clarified liquor for a waste liquor fed to the enclosure.

In yet another preferred feature of the present invention, the enclosure may have a floor which slopes downwardly from the outlet position to the inlet position.

BRIEF DESCRIPTION OF THE DRAWINGS

Having thus generally described the invention reference will now be made to the accompanying drawings illustrating preferred embodiments and in which:

FIG. 9(a) is a cross-section similar to FIG. 9, illustrating a modification;

FIG. 10 is a cross-section on the line 10—10 of FIG. 8, showing the lower edge in more detail;

FIG. 11 is a cross-section on the line 11—11 of FIG. 8, showing the upper edge in more detail;

FIG. 12 is a plan view of an alternative form of separator;

FIG. 13 is a side view of the separator in FIG. 12;

DETAILED DESCRIPTION OF THE PREFERRED EMBODIMENTS

Figure 1:
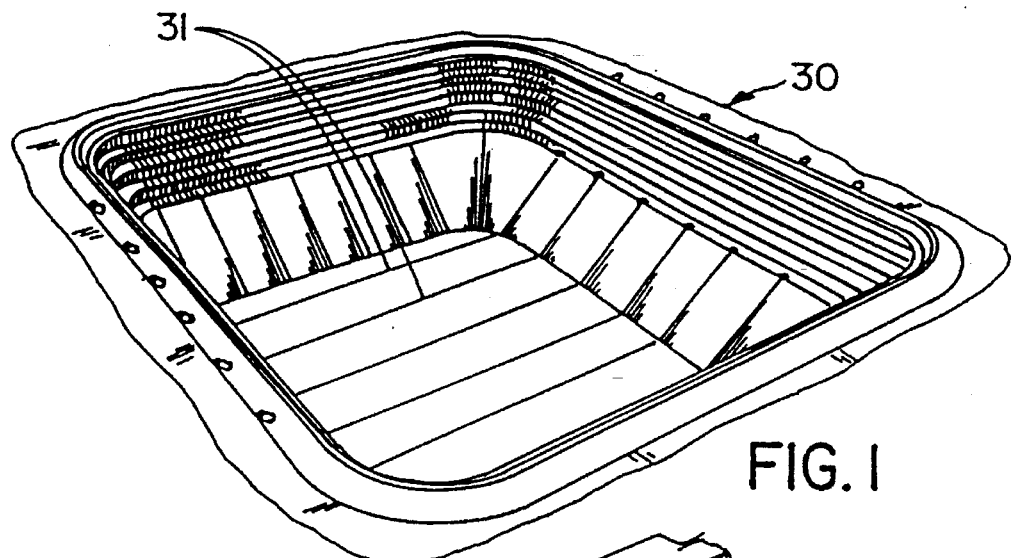
FIG. 1 is a perspective view of one form of conventional enclosure, container or other for containment and treatment of raw materials.

FIG. 1 illustrates an excavated site, indicated generally at 30. In the particular example, which is as described in the above-mentioned U.S. Pat. No. 4,672,691, the site can be partially formed by back fill, and has an earth bottom and partial side walls, the upper part of the side walls being formed by rock-filled baskets. A pattern of pipes 31 can be positioned on the bottom or floor, with a plurality of outlets for effluent to be supplied, and distributed, over the floor. Generally the excavation, hereinafter referred to as the enclosure, will have a lining of liquid-impervious material.

The walls of the enclosure can be formed in many ways, apart from the rock-filled baskets as in FIG. 1. Thus, the walls can be entirely of earth; partly earth and partly concrete; wholly of concrete, and of steel, for example. The actual construction will depend upon various criteria, such as space available, cost, and stability of the earth.

Figure 2:
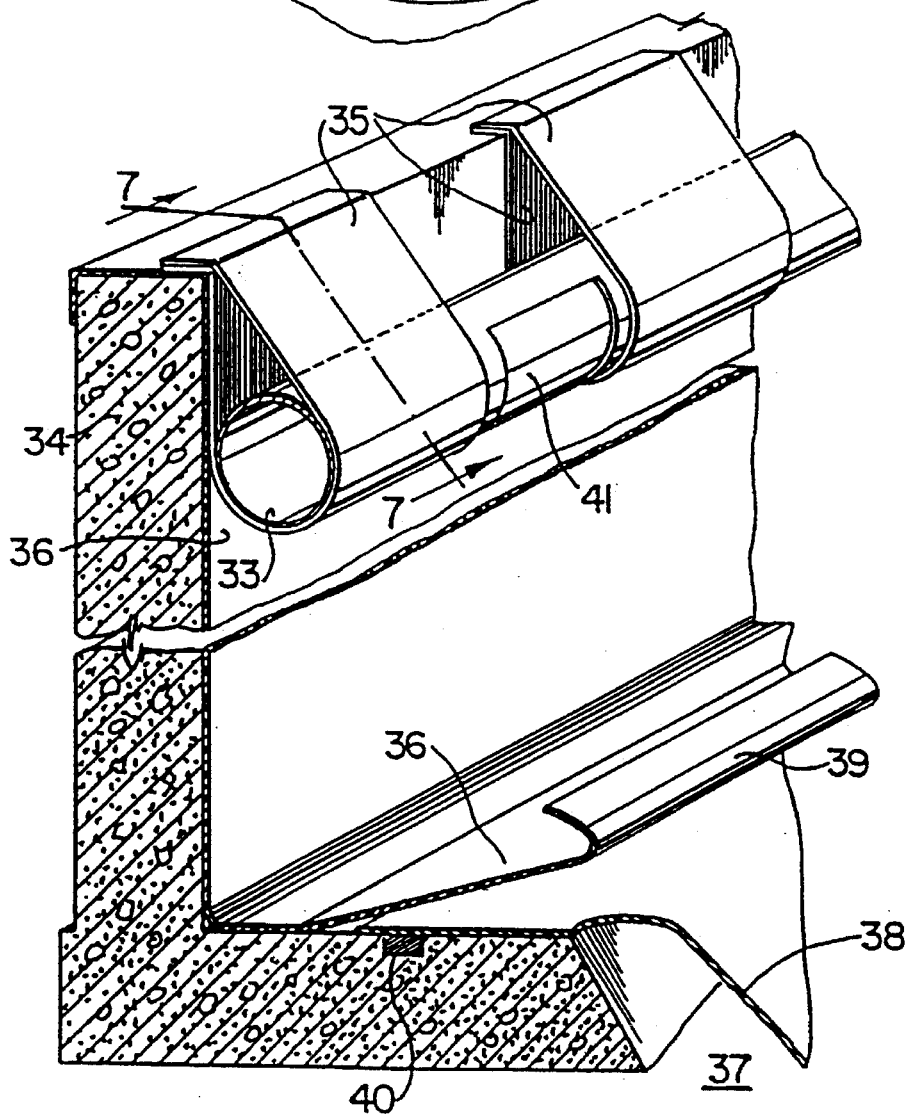
FIG. 2 is a perspective view of the proposed peripheral collecting pipe arrangement, with the enclosure wall in cross-section.

FIG. 2 illustrates an improved gas collection arrangement. In the above-mentioned patent, a collector conduit is positioned on the top of the side walls. In FIG. 2 a pipe 33 is suspended on the inside surface of the side walls 34, which, in the example, are of concrete, at least for the upper part. The pipe is suspended by a plurality of slings 35. The concrete wall is lined by a liner 36 and the sloping part of the wall, at 37, and the floor, not shown, also lined by a liner 38 overlapping at 39 and welded together. Timber member 40, imbedded in the concrete, can provide a stabilizing arrangement, the liner 38 being fastened to the timber by galvanized nails. The pipe 33 is provided with openings 41 for the entry of gas into the pipe. In an alternate arrangement, pipe 33 is in sections, spaced apart to form gas entry openings. Gas flow into and through the pipe is assisted by suction blowers, not shown. As will be described later, in connection with FIG. 7, a membrane cover is positioned over the enclosure.

It is often desired, particularly for large enclosures, that gas collection also occurs at positions spaced from the walls, by providing one or more additional gas collection conduits. Thus, for example, one or more floating conduits may extend the length, and/or the width of the enclosure. It is also possible that gas collection is by the floating conduits, without pipes at the periphery. Water evacuation ridges can be positioned on the floating conduits, if desired.

Figure 3:
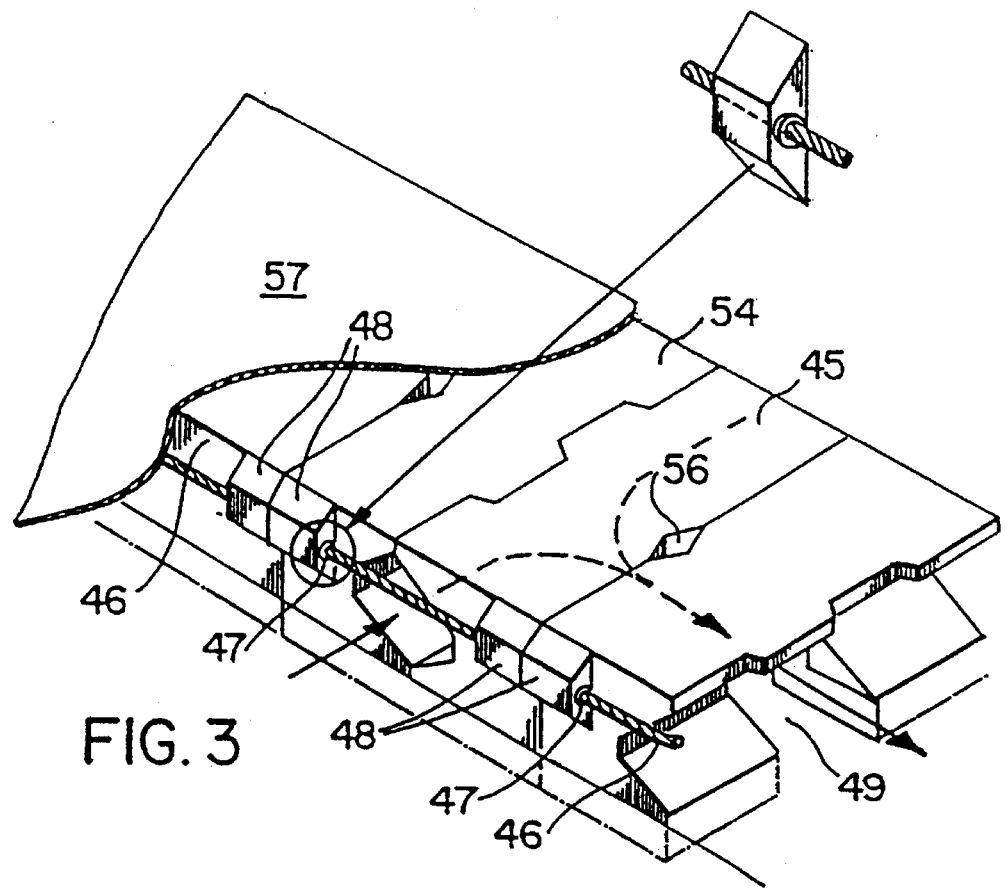
FIG. 3 is a perspective view of a central floating collecting conduit, with a walking platform.
Figure 4:
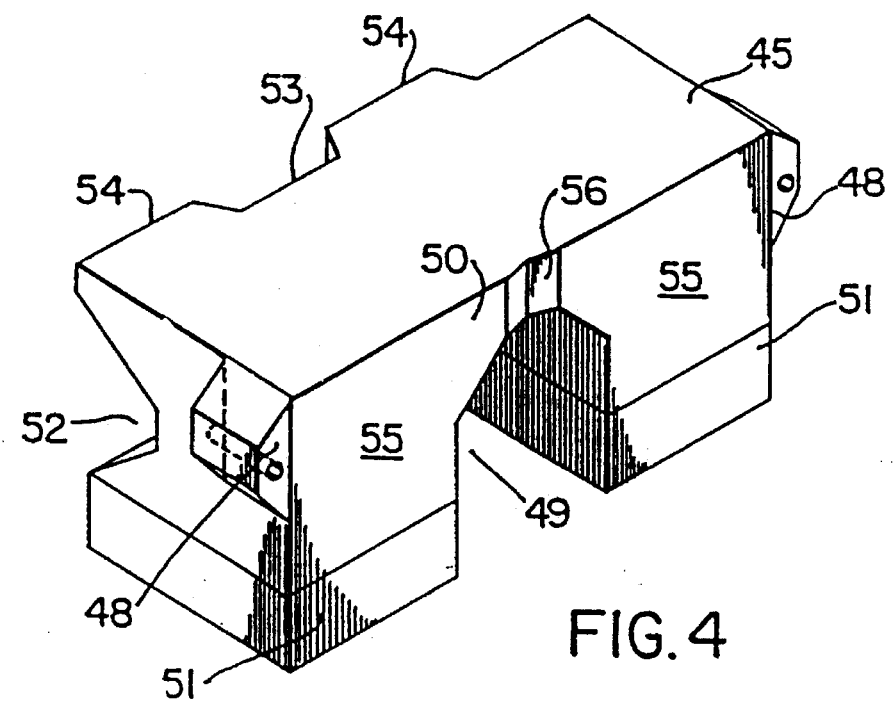
FIG. 4 is a perspective view of a single module as used to produce the collecting conduit of FIG. 3.

FIG. 3 illustrates one form of floating conduit composed of a number of modules as illustrated in FIG. 4. The modules 45 are attached together by a cable 46 with clamps 47, the cables extending through projections 48 on the modules. As seen in FIG. 4, each module 45 is of an inverted U-shape having a central channel 49, top 50 and side walls 51. A passage 52 is formed through each side wall into communication with the channel 49. One surface 53 of each module is ribbed, at 54. A projection 48 is formed on each side wall at the other surface 45. A small recess 56 is formed in the top 50, at surface 55, connecting with the central channel 49.

The modules are joined together in alternate orientation, so that the passages 52 are together and the projections 48 are together, as seen in FIG. 3, the central channels 49 forming a gas conduit. The modules are of a size, and flotation, sufficient to enable maintenance and other staff to walk on the modules. As seen in FIG. 3, cover, 57, rests over the modules. One exemplary size of a module is 7' by 3' plan form by 3' deep.

Where the amount of gas being collected is not enough to justify the large conduit with a walkway, a smaller floating conduit can be provided.

Figure 5:
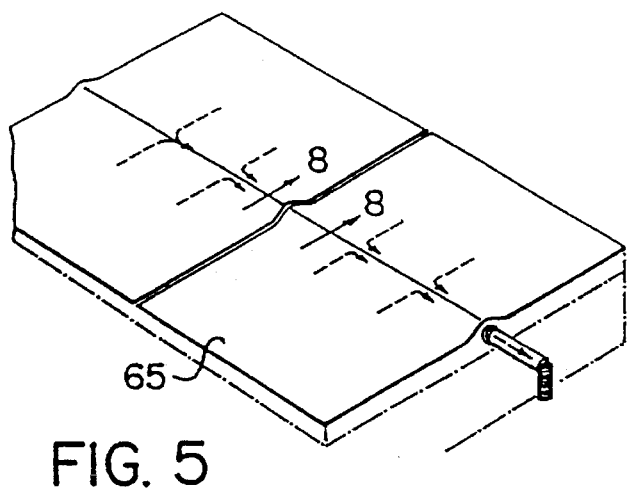
FIG. 5 is a perspective view of a further form of floating collecting conduit.
Figure 6:
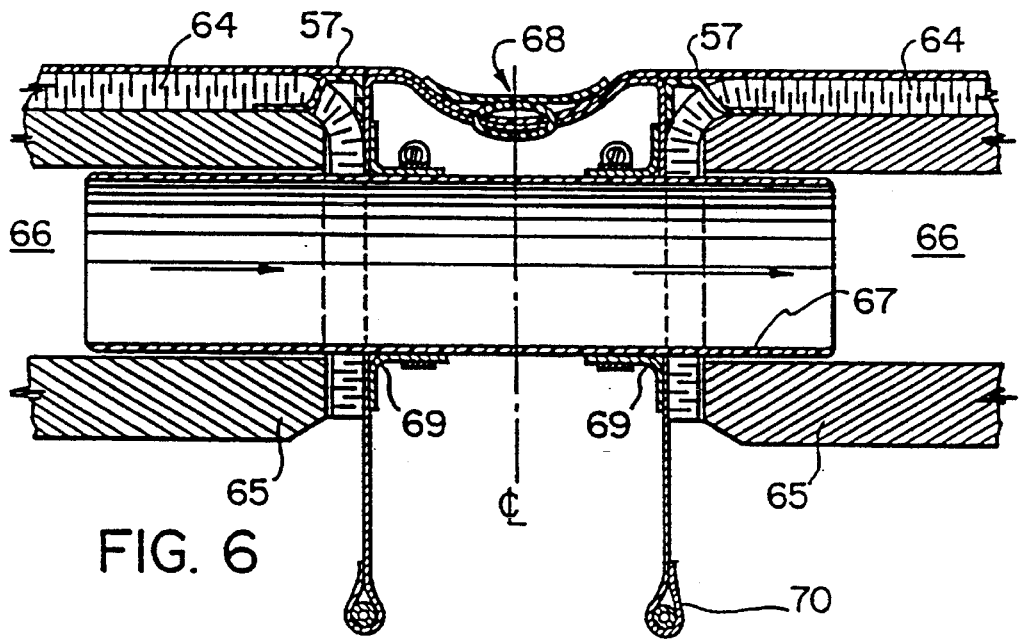
FIG. 6 is a cross-section on line 8—8 of FIG. 4.

A further arrangement for a floating conduit is illustrated in FIGS. 5 and 6. In this arrangement, large floating modules 65 having central tubes 66 are joined together by pipes 67. The cover 57 is carried over the joint between modules and can be slit to enable the pipes to be inserted, the edges afterwards being joined together and a sealing strip applied, as shown at 68. The pipes 67 are held in annular members 69 attached to the cover and can be weighted, as shown at 70. An insulation layer 64 is cut and folded down with the pipes passing through holes in the layer.

Figure 7:
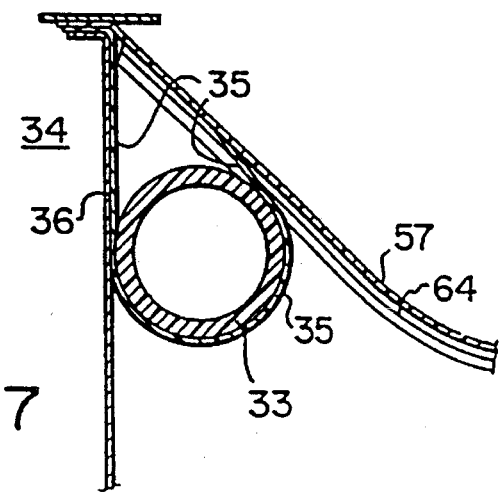
FIG. 7 is a cross-section, as at the line 7—7 of FIG. 2, showing the cover in position.

FIG. 7 illustrates the suspended form of peripherally extending collector pipe 33, as in FIG. 2, and the cover 57, with insulation layer 64. The pipe 33, in the example, is of PVC culvert pipe, with openings cut in the pipe to form gas entry openings, 41 in FIG. 2. The cover 57 is held down along the top of the wall by bolts. At the perimeter the insulation is attached to the biogas sling.

The action of the bacteria in the enclosure produces a gas, for example in an anaerobic fermentation, a mixture of methane and carbon dioxide, which, in the form of small bubbles, passes up through the wastewater. It is possible to position a gas baffle system in the enclosure whereby finely dispersed solids can settle, leaving a clarified liquor to be drawn off and forwarded to a next stage of treatment.

Figure 8:
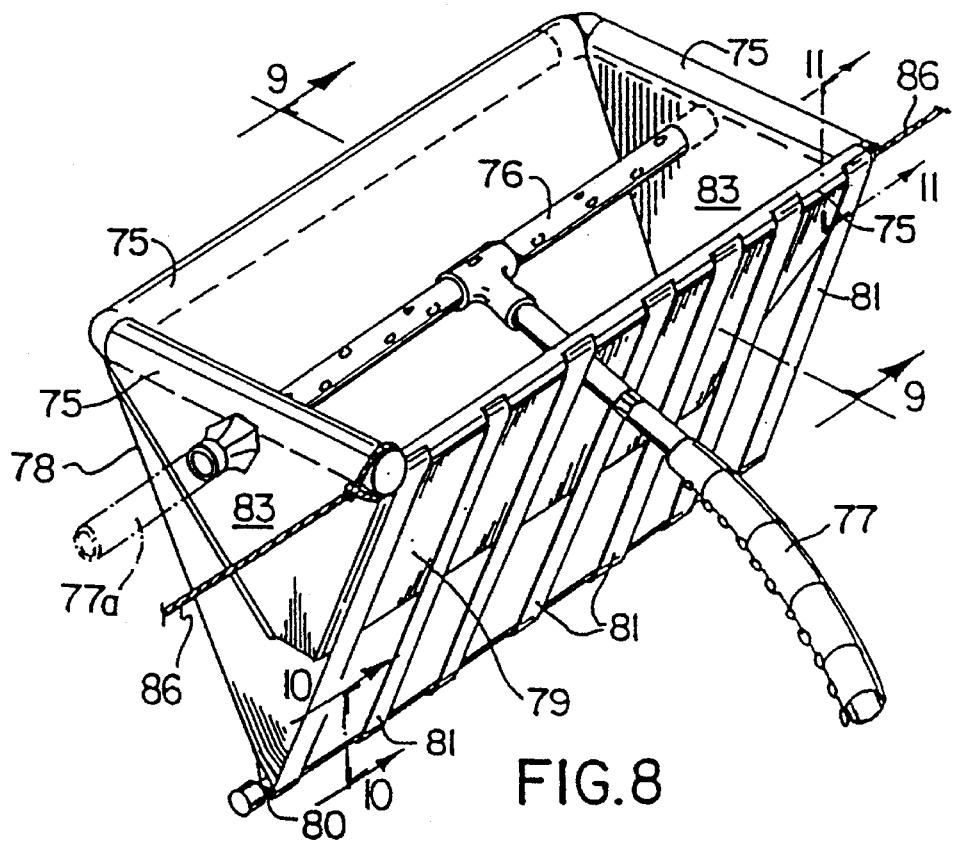
FIG. 8 is a perspective view of a gas-liquid-solids separator in accordance with a feature of the invention.
Figure 9:
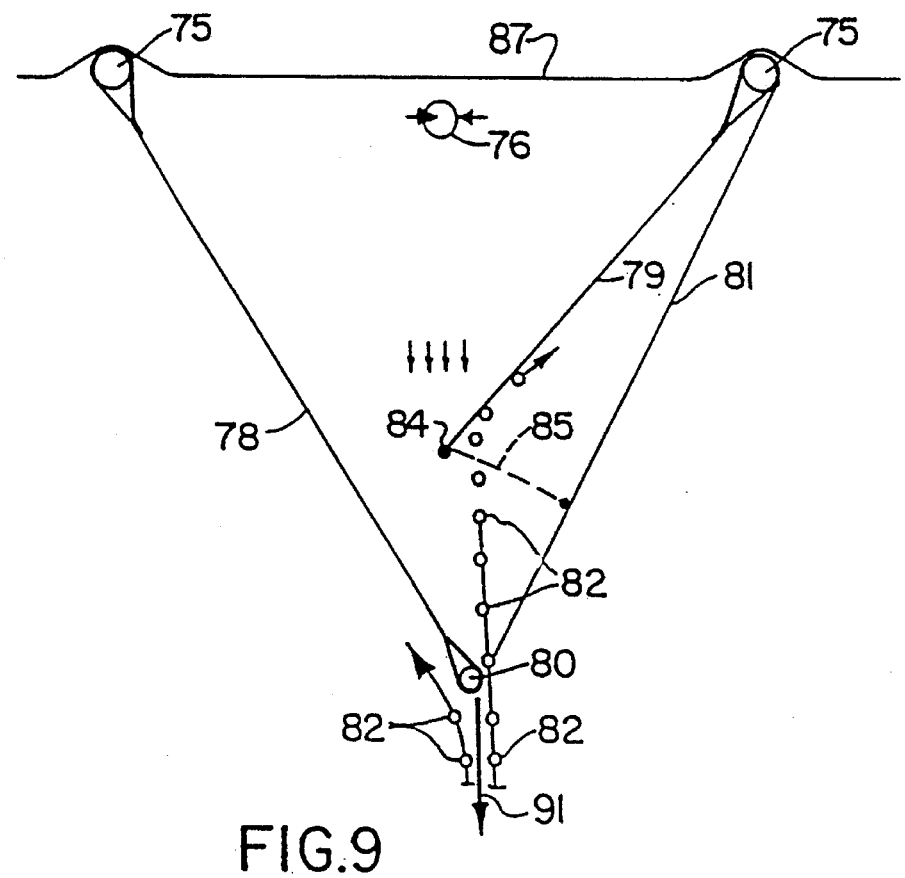
FIG. 9 is a cross-section, on the line 9—9 of FIG. 8.

FIGS. 8 to 11 illustrate one form of gas-liquid-solids separator. As illustrated in FIG. 8, there is a top flotation framework 75. A perforated header pipe 76 extends across the framework and an extraction pipe 77 is connected to the pipe. An alternative, or additional extraction pipe 77a can be connected to either end of pipe 76. From the framework 75 depends a V-shaped structure having two downwardly and inwardly inclined walls 78 and 79. These are also seen in FIG. 9. One wall, 79, is shorter than the other wall 78 and is inclined inwardly at a greater angle than wall 78. Both walls are of imperforate material. A weight 80 extends along the bottom of wall 78 and is supported from the framework by slings 81.

As can be seen in FIG. 9, rising bubbles of gas 82 are either deflected up along the outside on wall 78, or are deflected along the outside of wall 79. Within the space bounded by the walls 78 and 79, there is a quiescent zone, in which solids can settle out, the solids passing out through the opening between the bottom edges of the walls. The space can be closed at the ends by end walls 83. The lower edge 84 of wall 79 is stiffened and light cables 85 extend from the edge 84 to the slings 81 to keep the wall 79 in the correct position. Cables 86 can be provided to position the separator.

A cover 87, as shown in FIG. 9, extends over the surface of the enclosure, the flotation framework 75 holding the top of the separator in contact with the cover. The weight pipe 80 can be anchored to the floor, for security, by cables 91. Additional cables can also extend between floor anchors and the gas collecting conduit.

FIG. 9(a) is a cross-section similar to that of FIG. 9, illustrating a modification. In this figure, where the same reference numerals are used for common items, the cables 91 securing the weighted pipe 80 are passed through eye bolts 92 in the base of the enclosure. Cables 93 also extend between the eye bolts 92 and the collection conduit 33. A floating platform 94 acts to shed rainwater.

FIG. 10 illustrates, in more detail, the lower edge of the wall 78. The weight 80 comprises a sand-filled plastic pipe. The lower edge of the wall 78 and the lower ends of the slings 81 are wrapped around the pipe and secured, as by welding at 88. FIG. 11 illustrates in more detail the upper edge of the wall 79 and upper ends of the slings 81. The frame member 75, in the example, is a foam-filled pipe, to provide flotation. The upper edge of the wall 79 is wrapped around the pipe and welded, at 89. The upper ends of the slings 56 are taken over the pipe and welded to the wall 79, at 90.

Figure 14:
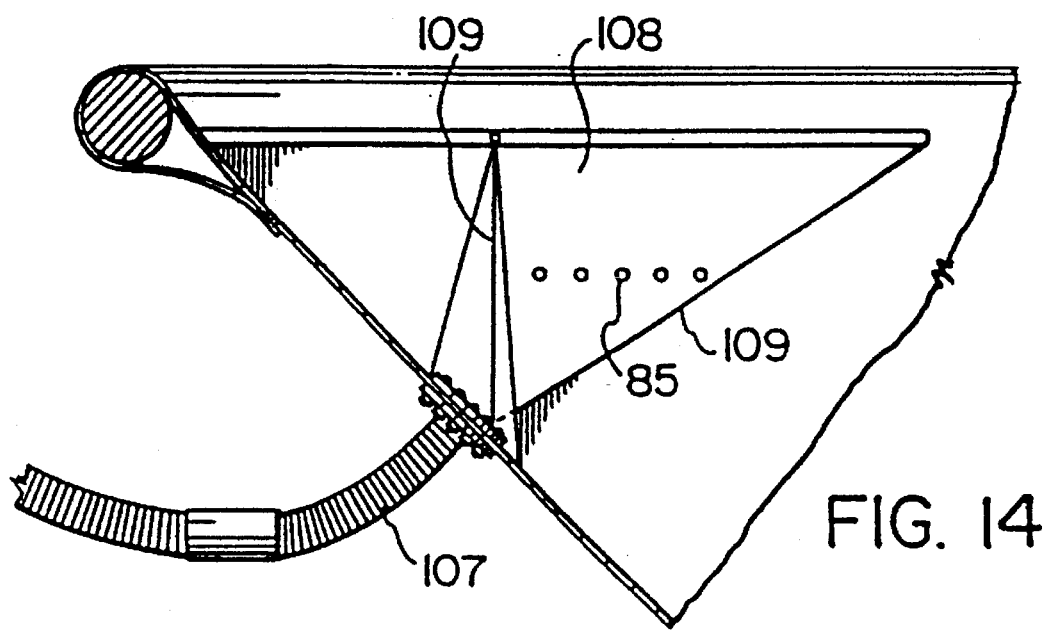
FIG. 14 is an enlarged view of the area within the circle A in FIG. 13.

FIGS. 12, 13 and 14 illustrate an alternative form of separator, in the form of a trough having downwardly and inwardly inclined walls 95 and end walls 96. The bottom of the trough is closed by a bottom wall 97. The bottom is formed by a rectangular frame of pipes. Side pipes 98 and one end pipe 99 form a sludge collection system, pipes 98 being perforated at 100. The other end pipe 101 and intermediate pipes 102 are sand-filled to hold the bottom of the separator down. The top of the separator is formed by pipe framework 103, for example foam-filled, for flotation, provided with mooring brackets 104. The end walls are perforated for the inflow of waste water. Alternatively, or in addition, the side walls 95 can be perforated.

In use, waste water flows into the separator through the perforated end walls 96. The solids settle out and are extracted through the pipes 98 and 99 via pipe 105, and pump 106. The clarified liquor is extracted via a pipe 107 from a small chamber 108 at one end of the separator. This is seen in more detail in FIG. 14. A diaphragm 84 extends upwardly and inwardly from each side wall 70 and also extends across the separator, being attached at its bottom edge to the end wall 96. In the example, the small chamber 108 extends approximately a third of the depth of the separator. The diaphragm 109 is perforated by a line of small openings 110. Clarified liquor flows through the openings 110 into the chamber 108 and then to the pipe 107. Bubbles rising up in the enclosure are deflected by the walls 95 and 96 and thus do not interfere with the settlement of solids in the separator.

Figure 15:
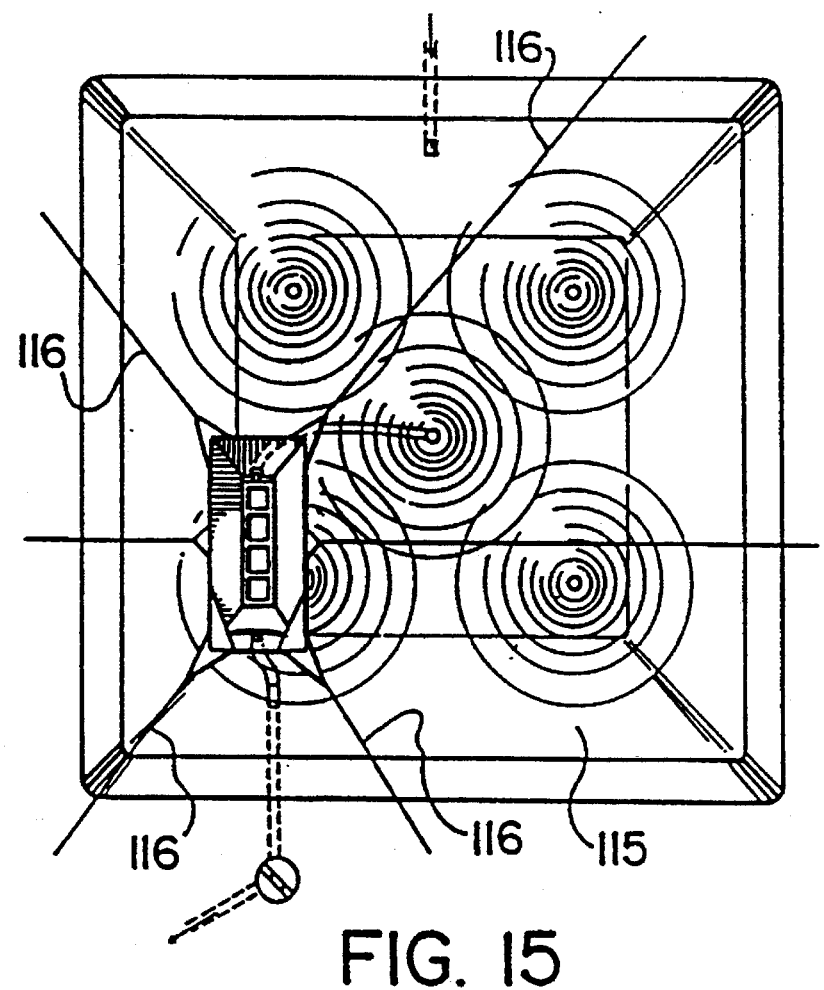
FIG. 15 is a plan view of the separator in a enclosure.

FIG. 15 illustrates a separator, as illustrated in FIGS. 12, 13 and 14 for example, positioned in an enclosure 115. The separator is held in position by wires or cables 116.

The separator of the form as illustrated in FIGS. 8 to 11, and in the form as illustrated in FIGS. 12, 13 and 14, can be attached to the cover membrane, instead, being of floating form moored in position. In such arrangements, the top edges of the walls 78, 79 and 83 in FIGS. 8 to 11 can be attached to the cover as by welding. The top edges of walls 95 and 96 of FIGS. 12, 13 and 14 can be similarly attached.

Figure 16:
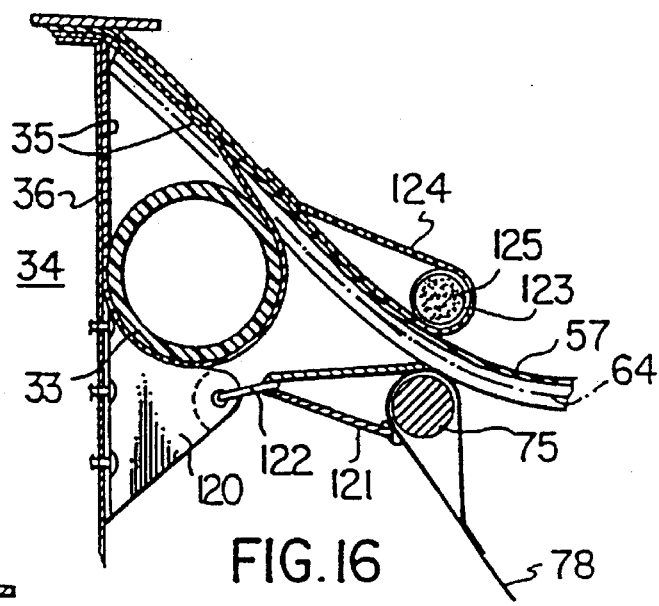
FIG. 16 is a cross-section, similar to that of FIG. 7, illustrating the attachment of a gas-liquid-solids separator, and also the provision of weighting means for the cover of the fermenter.

FIG. 16 is a detail illustrating a method of anchoring a separator, as in FIGS. 8 to 11 for example, to the side of an enclosure. Brackets 120 are attached to the wall 34 below the collector pipe 33. The framework 75 is positioned out from the wall, attached to the brackets 120 by ropes 121 and links 122, the framework resting against the cover 57 and insulating layer 64.

A further feature illustrated in FIG. 16 is a weighted pipe which rests on the cover to prevent, or at least reduce, flapping due to the wind. The pipe 123, in the example, is of PVC, suspended from the top of the wall by slings 124. The pipe is filed with sand at 125. The pipe is particularly provided to prevent flapping of the peripheral portions of the cover where it is not in contact with the fluid in the fermenter, and also serves as an attachment point for the weight lines on the cover.

Figure 16A:
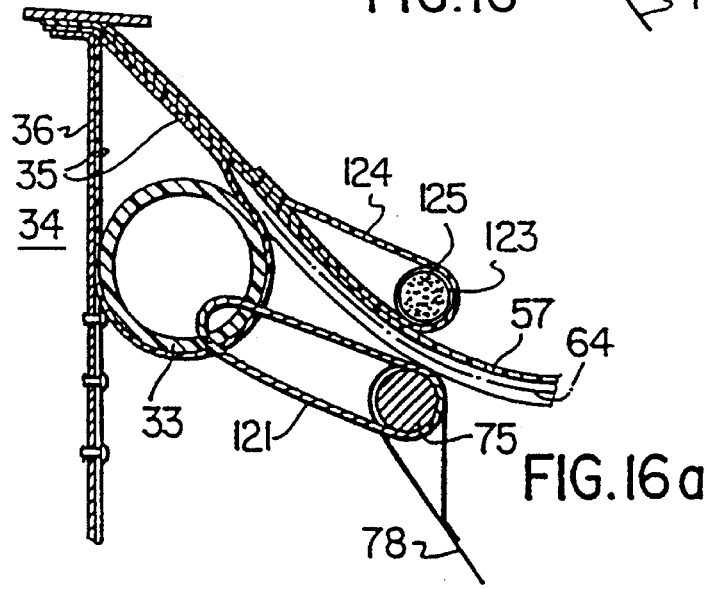
FIG. 16(a) illustrates alternative anchoring at the separator.

FIG. 16(a) illustrates an alternative way of anchoring the separator, common reference numerals being used. The ropes or ties 121 are connected directly to the collection conduit 33, avoiding the provision of brackets, and can be in the form of loops.

Figure 17:
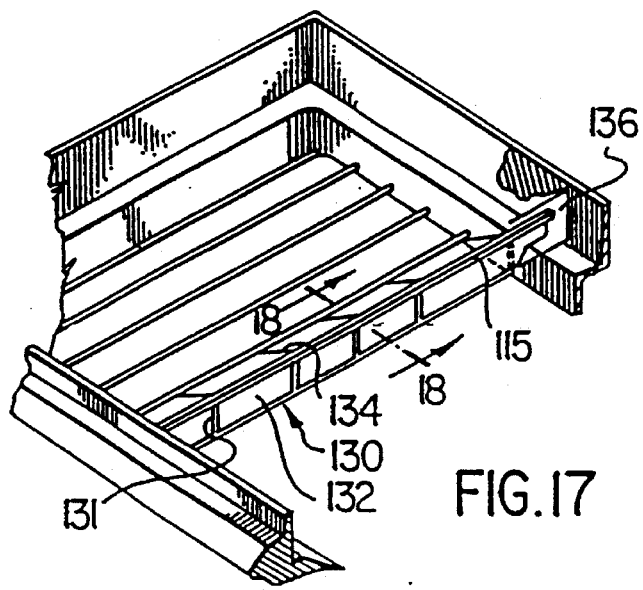
FIG. 17 is a perspective view of a baffle system.
Figure 18:
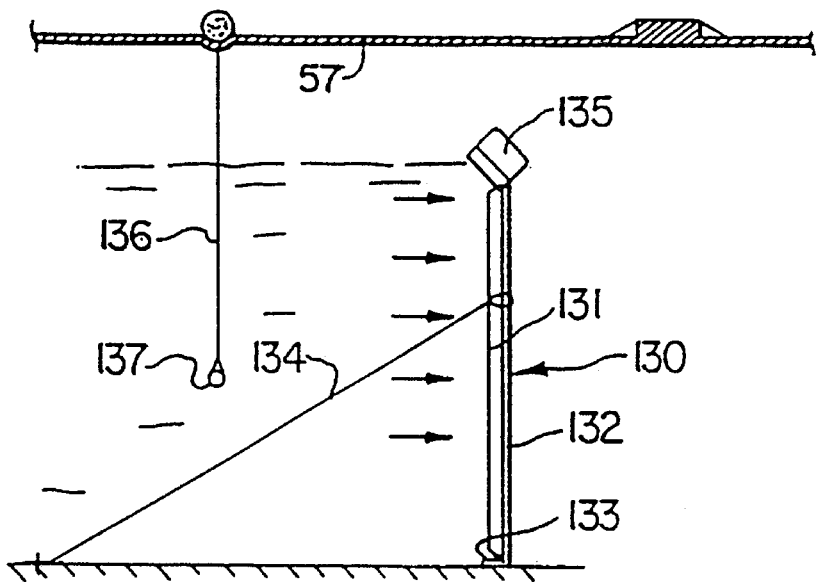
FIG. 18 is a cross-section, on line 18—18 of FIG. 17.
Figure 19:
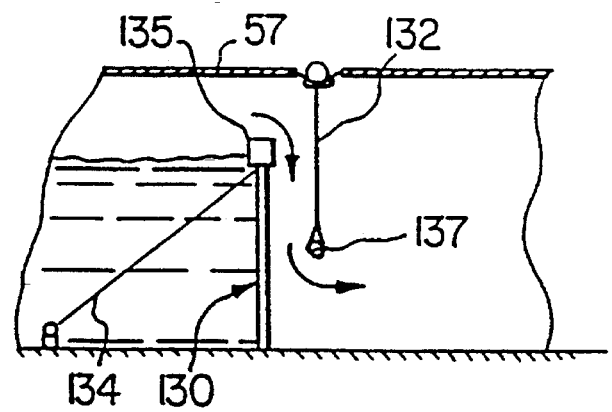
FIG. 19 is a cross-section similar to that of FIG. 18, illustrating the action of the baffle.

To assist in sludge retention at an inlet position, it is possible to provide a baffle extending across the enclosure. FIG. 17 is a perspective view of an enclosure with a baffle which is pivotally attached at its lower edge to the bottom liner, and which is erected, and held up in position, by the flotation effect of the liquor in the enclosure. As seen in FIGS. 18 and 19 a further baffle extends down from the cover a short distance downstream from the main baffle. As particularly seen in FIG. 18, the main baffle 130 has stiffeners 131 on a sheet of plastic 132. The baffle 130 is pivotally attached at its base 133 to the bottom liner 36. A plurality of rope ties 134 restrict pivoting up of the baffle past approximately the vertical. A float can be provided along the top of the baffle to ensure that the baffle will pivot up as the enclosure is filled. Adjacent to the main baffle 130 is positioned a secondary baffle 136. This comprises a sheet of plastic material suspended from the cover and having a weighted bottom edge 137. The secondary battle is seen upstream of the main battle in FIG. 18, and is seen downstream of the main battle in FIG. 19. The action of the flow is shown in FIG. 19.

Figure 20:
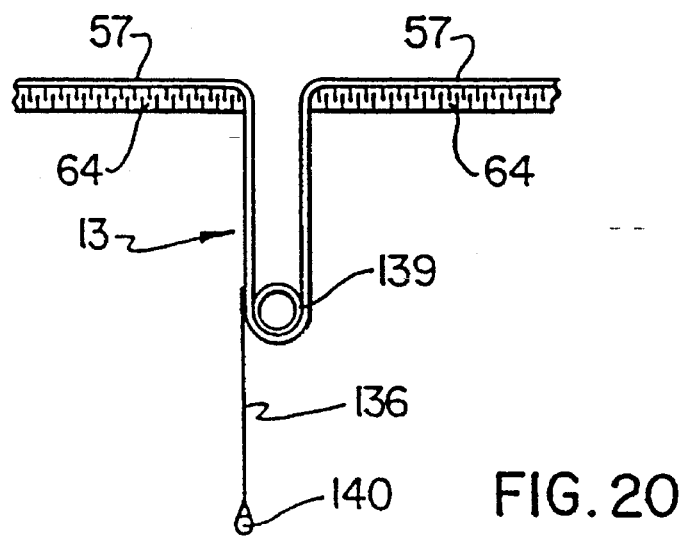
FIG. 20 illustrates the attachment of a baffle to the cover.

A more detailed illustration of one way of attaching the secondary baffle to the cover is shown in FIG. 20. A loop or fold 138 is formed in the cover 57, extending down through the insulation 64. A weight pipe 139 rests in the fold 138 and the baffle 136 is attached to the tabs. A chain weight 140 is positioned in a tube 141 at the bottom of the baffle.

The provision of the baffle causes retention of the sludge at an inlet position of the enclosure. The inlet position is the most active position. On the side of the baffle remote from the inlet, activity is weaker but some bubbling still occurs.

If a gas-liquids-solids separator is used, it is positioned remote from the inlet, enabling improved settlement of fine solids to occur with an improved clarity of the effluent.

Also illustrated in FIG. 20 is a weighted pipe 139, in the example of PVC filled with sand. This weights the cover as described later.

Figure 21:
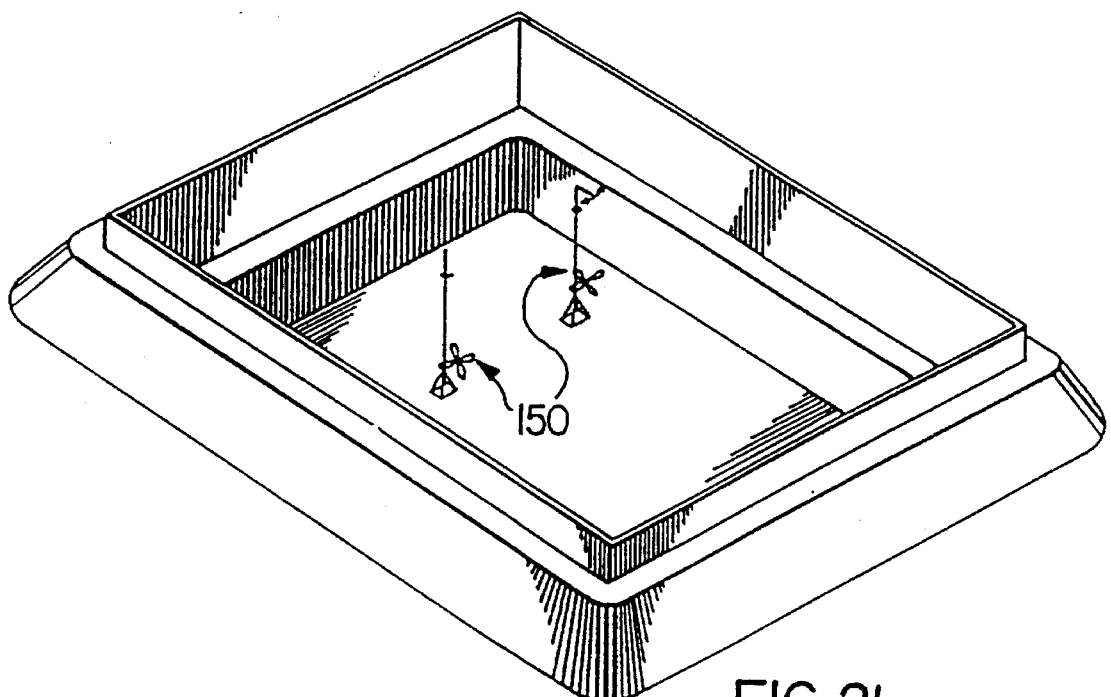
FIG. 21 is a perspective view of an enclosure, illustrating the provision of mixers.
Figure 22:
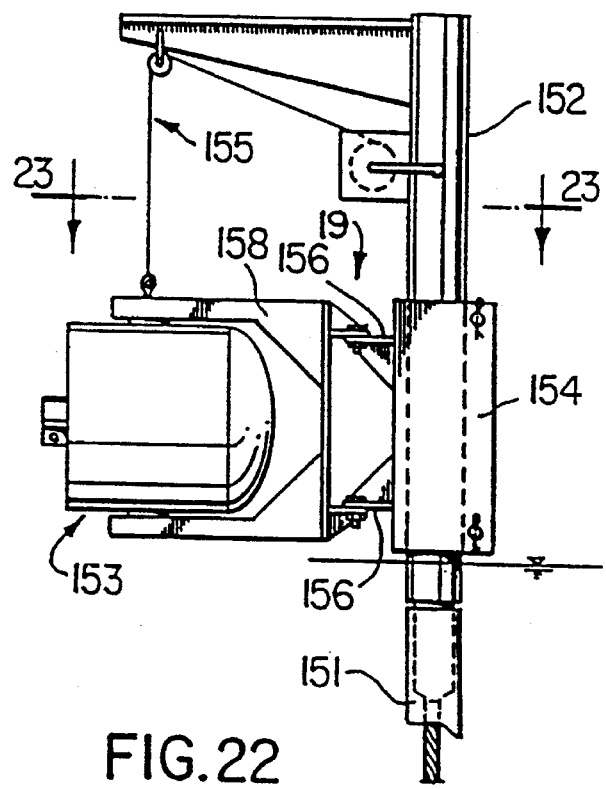
FIG. 22 is a side view of a mounting for motor and propeller of a mixer.
Figure 25:
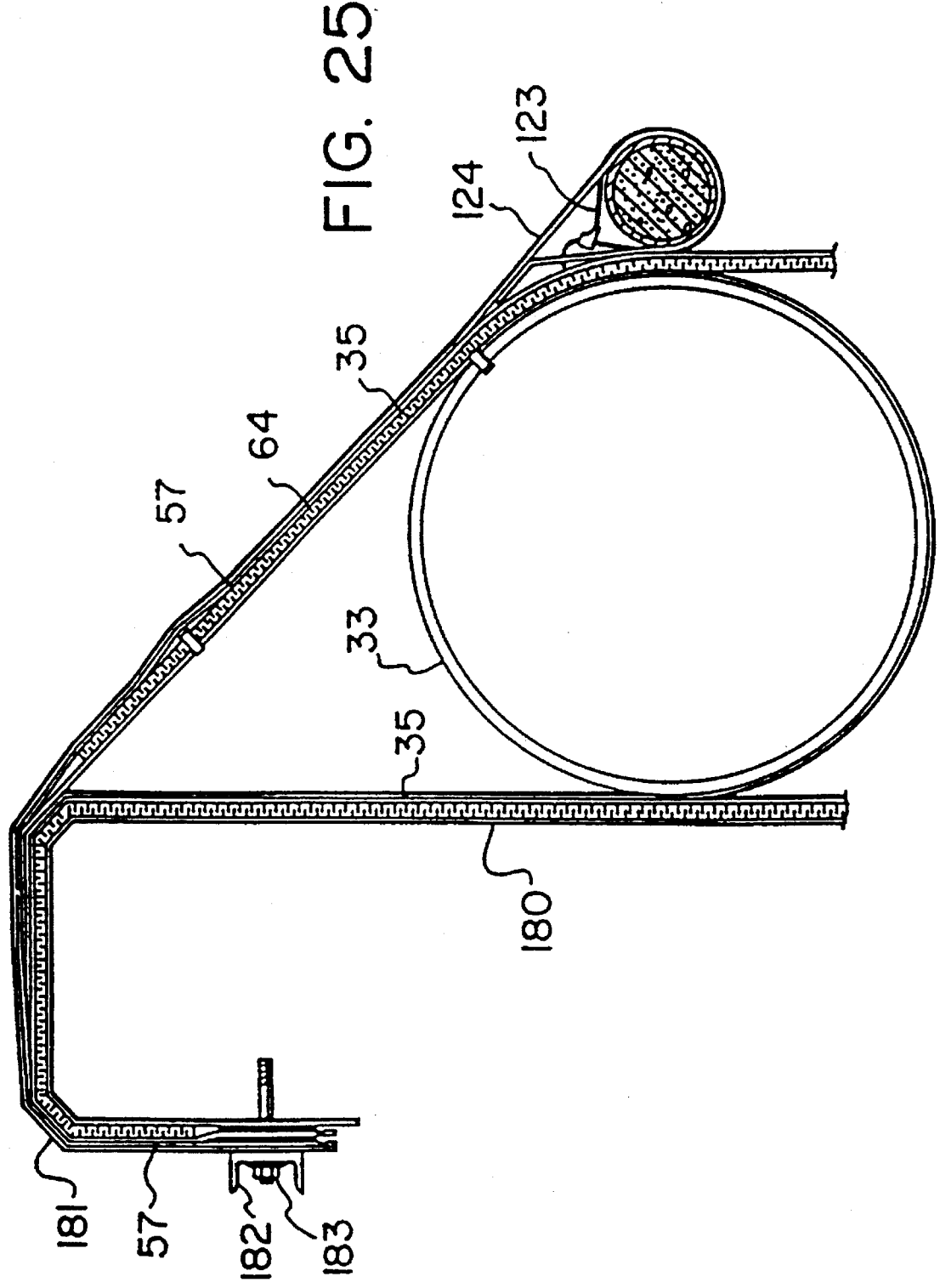
FIG. 25 illustrates an alternative arrangement for anchoring the cover and conduit slings, to the container wall.

It is often desirable to provide mixing of the contents of the enclosure. FIG. 21 illustrates mixers 150 mounted on posts or rails permanently installed on the bottom of the enclosure. As will readily be seen in FIG. 22, each mixer comprises the bottom post of rail 151 and a removable post 152. Both of the posts 151 and 152 have a square cross-section, as shown in FIG. 25, and a motor and a propeller unit 153 is slidably mounted by a sleeve 154 on the post, being raised and lowered by a davit 155. The post, motor and propeller unit and davit are lowered onto the lower post 151, the cross-sections being aligned and the motor and propeller unit then lowered, onto the lower post 151, to the desired level. The orientation of the upper post 152 with the motor and propeller unit, can be varied relative to the lower post, for example, in steps of 90°, providing variation in the mixing flow direction. Means are provided for ensuring correct alignment of the posts 151 and 152, as by having a square stub at the bottom end of the upper post 152 and a square aperture at the top end of the lower post.

Figure 23:
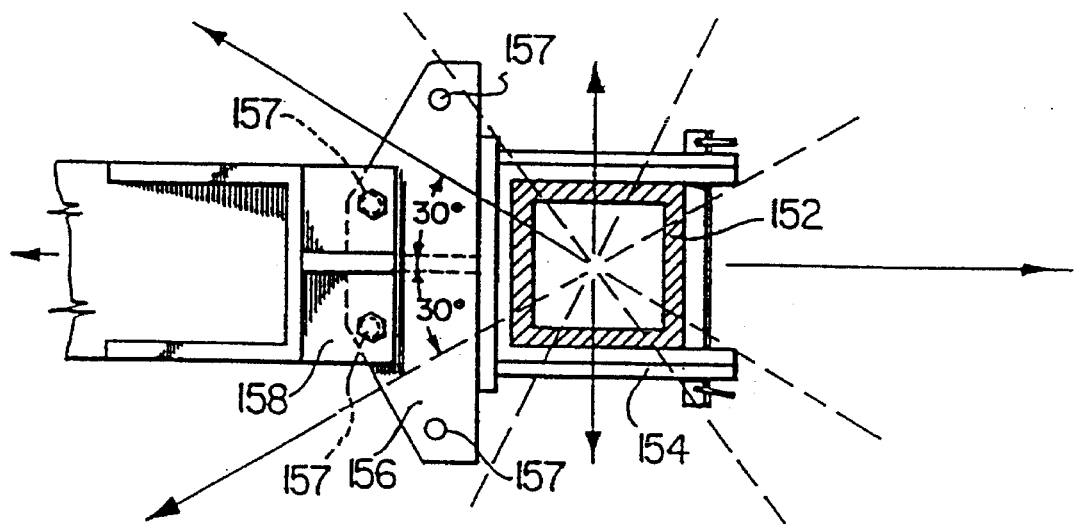
FIG. 23 is a cross-section on line 23—23 of FIG. 22.

A further, finer adjustment to the motor and propeller alignment can be provided by mounting the motor and propeller unit on brackets 156, in turn mounted on the sleeve 154. As seen in FIG. 23, the brackets have holes 157 which are in pairs providing, in the example, a 30° variation in the mounting of a mounting bracket 158 of the motor and propeller unit 153.

It is desirable to provide a weighting arrangement for holding the cover down on top of the liquid in the enclosure. In the above-mentioned U.S. patent, a pattern of chains is described. An alternative arrangement is a pattern of pipes filled, for example, with sand. These pipes are pivotally connected together to form a grid-like pattern, or other pattern over the cover. The pipes are generally attached at ends to the periphery of the enclosure. This allows for some relative movement between cover and pipes.

The weighting of the cover forms channels which can collect rainwater, and the channels can be connected, with a central collecting position from which the water can be pumped. To provide for extra rainwater storage, one or more folds can be formed in the cover, with the folds becoming immersed in the enclosure liquor as they fill with rain.

In addition to using weights to hold the cover down, to prevent ballooning of the cover, weights can be used to determine paths along which gas will migrate to the collection system. For example, with a peripheral collection system, weights will determine paths which lead to the periphery. For a central collection system paths will be determined which lead to the central collection system. When both peripheral and central collection systems are used, paths to both systems or either system, can be determined. The weights used to determine the paths can also serve to hold the cover down. Ballooning is likely to occur as a result of winds blowing across the cover.

Another way of assisting the migration of the gas is to use a corrugated form of insulation. As an example, the insulation layer 64 can be of corrugated form, or have a corrugated inner surface. The corrugations would lead towards the gas collecting conduits, whether at the periphery, centrally located, or both.

Figure 24:
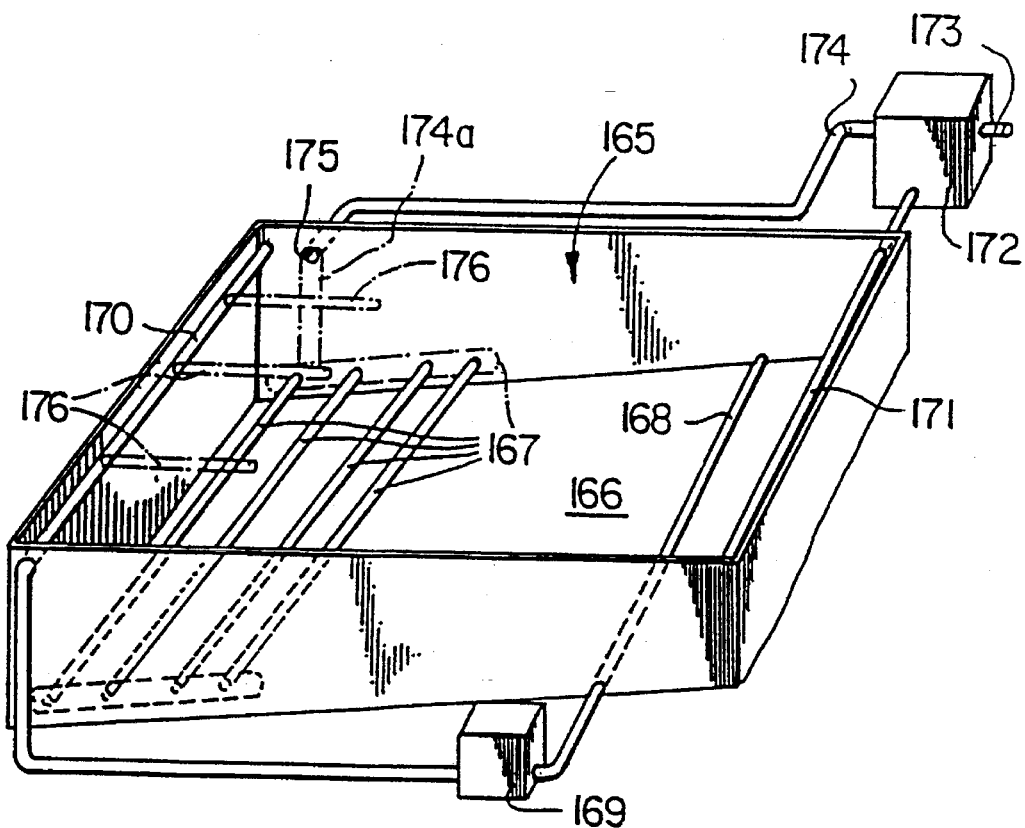
FIG. 24 is a perspective view of an enclosure with sludge recirculation and effluent recirculation, and sloping bottom.

FIG. 24 illustrates an enclosure 165, in the example having vertical walls, which may be of concrete or metal, and a sloping bottom 166. The bottom slopes downwards towards the inlet position and supply pipes 167 for the waste material for treatment are, in the example, only at the inlet position. The sloping floor encourages retention of a sludge blanket over the inlet pipes and gives improved activity. A baffle arrangement as in FIG. 19 can also be provided. As a modification, the floor can slope from each end either to a low centre position or to a low position at each end.

A sludge extraction pipe 168 is provided at the outlet end, the sludge being pumped by pump 169. From the pump 169 the sludge can be mixed with the incoming fluid, or fed separately as by a header pipe 170, or a combination of both. Relatively clear effluent is drawn off through a header pipe 171, and passed to pump 172. From pump 172, liquid can be sent via pipe 173 to a further treatment stage, via pipe 174 back to an inlet 175 at the inlet end of the enclosure, or both. The effluent, from the pump 172, can alternatively be mixed with the incoming fluid via a pipe 174a to a header 167a for the pipes 167. The header pipe 170 can have further pipes 176 extending normal thereto to spread out the flow. The pipes 170, 171 and 176 are suitably perforated to enable flow out of or into the pipes. As a modification, inlets can be at each end and an outlet at the centre, or the inlet at the centre and outlets at each end.

FIG. 25 illustrates an alternative arrangement to anchoring the cover to the enclosure sidewall. Common reference numerals are used where applicable. In this example the enclosure has a liner 180. The collection conduit 33 is supported by slings 35 which are welded to the liner. The liner 180, cover 57 and slings 181 supporting the weighted pipe 120 (FIG. 16), extend over the top of the side-wall and down the outside of the side-wall, being fastened by an aluminum channel member 182. Channel member is attached to the side wall by bolts and nuts 183.

For various purposes, as for the installation of the mixers, for example, and for sampling and other purposes, closable openings can be formed in the cover. Such openings can also act as relief ports to prevent building up of gas pressure under the cover. Normally a slight sub-atmospheric pressure is maintained under the cover by the suction blowers extracting the gas. However, a slight positive pressure can be permitted under the cover, to provide for any sudden increase in gas production, for example, or to permit changing or maintenance of blowers or other reasons. Above the slight positive pressure, it is necessary to vent gas, to prevent lifting of the cover too far, and overstressing the cover, although some excess material is provided, as for rainwater storage channels. The cover is also capable of adjusting to rising or falling liquid levels in the enclosure.

We claim:

1. A method of treating a liquid effluent by fermentation, comprising; positioning a gas collection conduit around at least part of the periphery of an effluent container; positioning a gas-impermeable cover of said effluent container; pumping effluent into said container for fermentation therein; collecting gas emanating from said effluent into said gas collection conduit; extracting said gas from said conduit; and removing clarified liquor from said container.

2. A method as claimed in claim 1, including the treatment of the extracted gas.

3. A method as claimed in claim 1, including recirculating at least part of the clarified liquor.

4. A method as claimed in claim 3, including feeding the recirculated liquor into the container with the pumped effluent.

5. A method as claimed in claim 1, including removing treated sludge from the container.

6. A method as claimed in claim 5, including recirculating at least part of the removed sludge back into the container with the pumped effluent.

7. A method as claimed in claim 1, including positioning at least one separator at an upper part of the container, deflecting rising fermentation gas around the separator, and removing clarified liquor from within the separator.

8. A method as claimed in claim 1, including positioning baffles across the container between an inlet end and an outlet end.

* * * * *